Jan. 26, 1926.  
T. BURNS  
1,570,992  
REGENERATIVE FURNACE  
Filed Dec. 21, 1923

INVENTOR  
Timothy Burns.  
BY  
a. B. Reavis  
ATTORNEY

Patented Jan. 26, 1926.

1,570,992

UNITED STATES PATENT OFFICE.

TIMOTHY BURNS, OF BUFFALO, NEW YORK, ASSIGNOR TO BETHLEHEM STEEL COMPANY, OF BETHLEHEM, PENNSYLVANIA, A CORPORATION OF PENNSYLVANIA.

REGENERATIVE FURNACE.

Application filed December 21, 1923. Serial No. 681,929.

*To all whom it may concern:*

Be it known that I, TIMOTHY BURNS, a citizen of the United States, and residing at Buffalo, county of Erie, State of New York, have invented certain new and useful Improvements in Regenerative Furnaces, of which the following is a specification.

My invention relates to regenerative furnaces and it has for its object to provide transverse metallic beam structures in the roof of such a furnace in order to divide the latter into sections and to sustain lateral thrusts therefrom.

Apparatus made in accordance with my invention is illustrated in the accompanying drawings, forming part of this application, in which.

Figure 1:
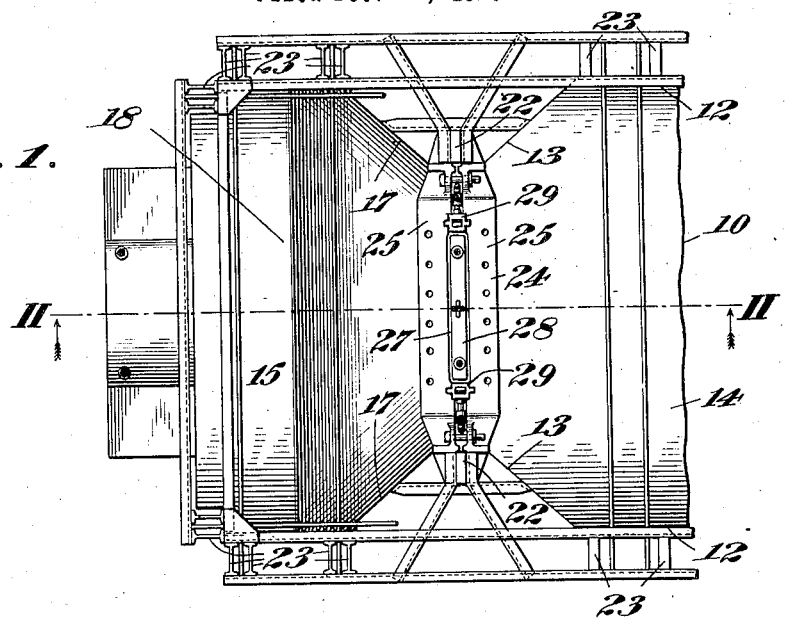
Figure 1 is a plan view of a furnace showing my improved beam structure applied thereto.
Figure 2:
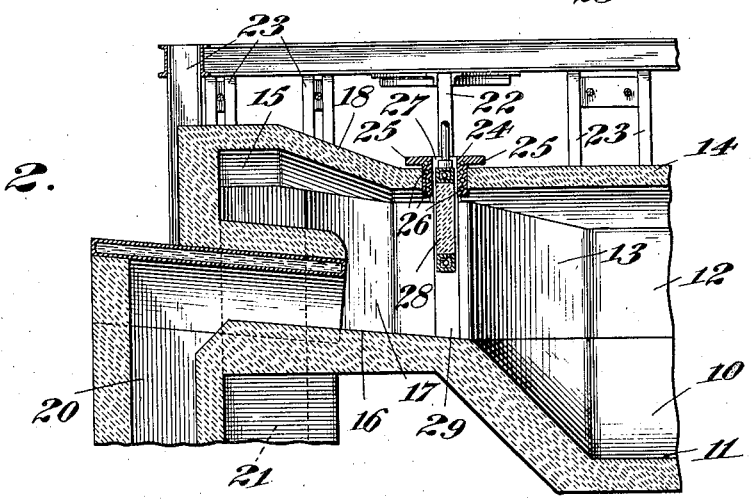
Figure 2 is a longitudinal sectional view of the apparatus shown in figure 1.

Referring now to the accompanying drawings for a more detailed description of my invention, in Figures 1 and 2 I show a portion of a furnace or melting chamber, at 10, which is comprised by the hearth 11, parallel side walls 12, converging end walls 13, and a roof section 14, and one end chamber, at 15, comprised by a bottom 16, converging side walls 17, and a roof section 18. It is to be understood that each end of the furnace is similarly constructed and that, therefore, the detail illustration and description of one end is regarded as being sufficient for the purpose of a disclosure of my invention.

The end chambers 15 serve in a well-known manner as mixing or combustion chambers, gas being supplied thereto by the gas uptake 20 and air being supplied by the air uptake 21.

The converging walls 13 and 17 at each end of the furnace constitute reentrant or monkey walls and I show inset buckstays 22 to afford lateral support to the latter, the furnace being supplied with other pairs of opposed buckstays 23 in the usual manner.

Figure 3:
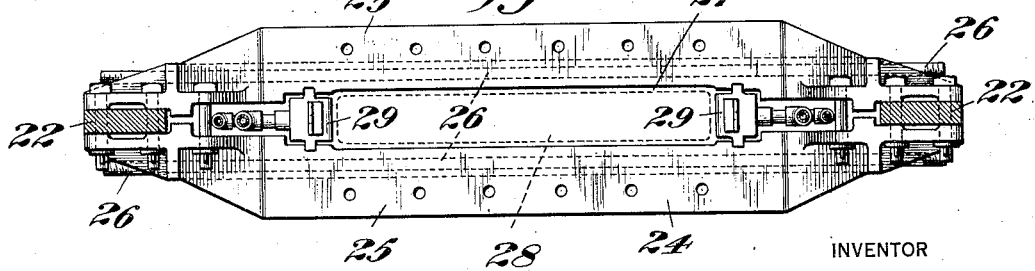
Figure 3 is a detail plan view of a portion of the beam structure.

The opposed inset buckstays 22 are connected by a transverse beam structure, at 24, which serves to separate the roof sections 14 and 18; and, as illustrated in Figure 2, such beam structure would serve to afford lateral support to the roof sections particularly if such sections are inclined in the direction of the length of the furnace. The beam structures, at 24, are preferably constructed of complemental beam members 25 which are secured to opposite sides of a buckstay 22 as indicated in Figure 3. As the beam members 25 are subjected to intense heat, I preferably provide the latter with water cooling conduits or passages 26.

I show a pair of beam members 25 which are spaced apart sufficiently to define a damper entrance slot or opening 27 for a damper 28 and to receive water cooled liners or knuckles 29 arranged oppositely to the vertical edges of the damper.

From the foregoing, it will be apparent that I have provided a furnace having its roof divided into a plurality of sections by transversely extending beam structures, whereby the sections may be independently repaired or rebuilt, thereby making the maintenance of the furnace more economical.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention, what I claim as new and desire to secure by Letters Patent is:

1. In a regenerative furnace, in combination, end portions having reentrant side walls, a roof, buckstays for supporting the reentrant side walls, and a beam structure connected to opposite buckstays and constituting a portion of the roof.

2. In a regenerative furnace, the combination of a melting chamber, mixing and combustion chambers at the ends of the melting chamber, opposed pairs of buckstays at the ends of the melting chamber, beam structures secured to the opposed pairs of buckstays, roofs for the mixing and combustion chambers sloping downwardly toward the melting chamber and engaging said beam structures, and a roof for the melting chamber interposed between and engaging said beam structures.

3. In a regenerative furnace, in combination, a mixing and combustion chamber, a furnace chamber, said mixing and combustion chamber including reentrant side walls and a roof sloping downward toward the furnace chamber, buckstays in contact exteriorly with the reentrant walls, a beam structure connected to the buckstays and in contact at one side with the lower end of the sloping roof, and a furnace roof contacting with the other side of the beam structure.

4. In a regenerative furnace, in combination, monkey walls at the furnace ends defining passages which flare toward the furnace and toward the regenerators, roofs for the regenerator flaring portions of the passages which slope downwardly toward the furnace flaring portions, transverse beams for supporting the lower ends of said roofs, and a roof for the furnace flaring portions and the furnace proper in juxtaposition with respect to said beams.

5. In a regenerative furnace, in combination, a melting chamber, regenerator passageways communicating with the chamber, downwardly-sloping roofs for said passages, transverse beam structures for supporting the lower ends of said roofs, and a melting chamber roof having its ends engaging said structures.

6. In a regenerative furnace, in combination, a melting chamber, inlet and exhaust passages for the melting chamber, roofs for the passages whose crowns slope downwardly toward the melting chamber, beam structures disposed transversely of the crowns of the roofs for supporting the latter, and a melting chamber roof having its ends engaging said structures.

In testimony whereof I hereunto affix my signature this 8th day of December 1923.

TIMOTHY BURNS.